UNITED STATES PATENT OFFICE

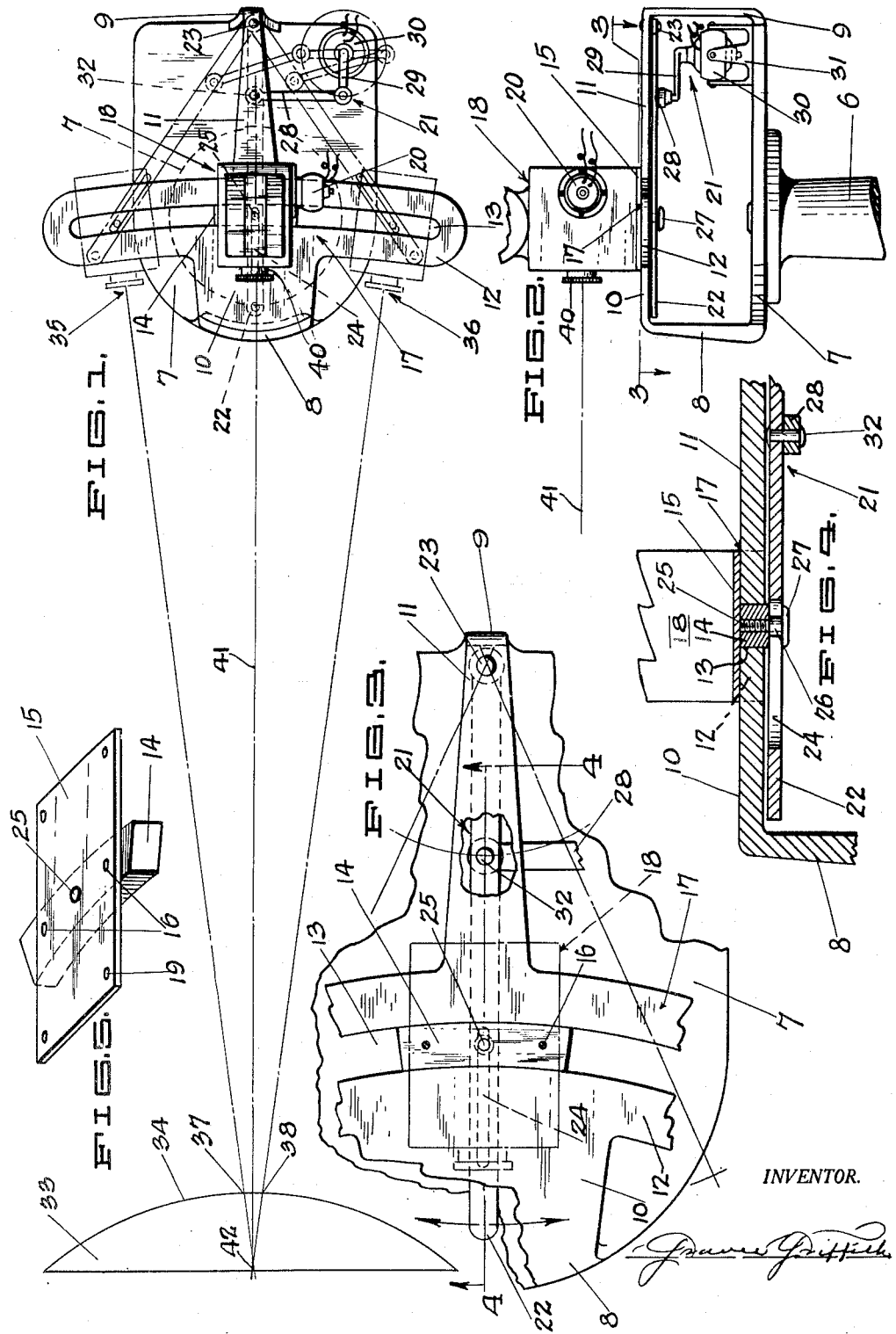

GRAVES GRIFFITH, OF SAN FRANCISCO, CALIFORNIA, ASSIGNOR TO GRIFFITH CAMERA CORPORATION, LTD., OF SAN FRANCISCO, CALIFORNIA, A CORPORATION OF CALIFORNIA

MEANS FOR THE ELIMINATION OF DISTORTION AND THE CREATION OF STEREOSCOPIC EFFECTS IN MOVING PICTURES

Application filed October 14, 1929. Serial No. 399,440.

The present invention relates, broadly, to new and useful means for the elimination of distortions as they appear in projected moving pictures, and, as well, to securing through the action of the same mechanism stereoscopic effects in the taking and projection of such pictures.

The screen best adapted for securing complete elimination of image distortion and the securement of the most satisfactory stereoscopic effects should be of arcuate form, and may be considered as a section of the curved surface of a cylinder of extreme diameter, to insure as small a departure as possible of the screen-arc from its chord, with either its convex or concave surface adaptable for use for projection purposes.

In the present presentation of the device, a projector has been selected for the purpose of illustrating the principle involved, though it is equally applicable in connection with the camera. As thus presented, the projector is shown as mounted for a shuttle-like movement through an arc of a circle circumscribing that of the screen-arc, with projection taking place upon the convex surface of the screen. Obviously, these relative conditions may be reversed, wherein the screen-arc would become that of the circumscribing circle and the arc of movement of the projector that of an inscribed circle. Whatever the application, it is to be observed that arcuate travel for both camera and projector must be of like character.

The mechanism for bringing about the movement through an arc of the projector may be of any desired character, but, as here shown, it has been made to consist of a support carrying an arc-track upon which the camera or projector is so mounted that it may be made to take an arc-course of shuttle-like character, back-and-forth movement, through its arc, by means of a pivoted actuating lever having link connection to a crank mounted upon the driving-motor shaft, the motor being timed to actuate the lever in synchronism with motion picture requirements.

The primary object of the invention is the provision of novel means for bringing about high-speed oscillatory movement of a projector in a predetermined arc relative to the screen upon which the pictures are being projected, to eliminate distortion thereof and to simultaneously produce therein stereoscopic effects.

Another object of the invention is to provide in its simplest and most effective form a mechanism for causing to be given to a camera or a projector a high-speed oscillatory movement through a given arc, without affecting the smoothness of operation of camera or projector in taking or projecting pictures.

A further object of the invention is to provide a means for causing to be imparted to a camera or a projector an oscillatory movement through arc of such character that the optical axis of the objective and the incident ray will at all times be in coincidence, if prolonged, and constitute radii of a common circle.

An additional object of the invention is to provide a means adapted to carry a projector through an arc-course in shuttle-like movements and in such manner as to cause the optical axis of the objective and the centrally projected ray therefrom to maintain coincidence, as from and to the center of a circle of which the said arc-course is an arc of its circumference, the two coinciding elements rotating about said center as ever-changing radii within the limits of said arc, for the purpose of picture projection upon a curved surface whose arc of curvature is concentric with that of said arc-course.

Other objects and advantages of the invention will appear as this specification progresses, and be more fully brought out in the claims hereunto appended.

In the accompanying drawings, forming a part of this specification, and in which similar characters of reference refer to like parts, throughout:

Figure 1 is a plan view illustrating the mechanism employed for bringing about the oscillatory or shuttle-like movements of the camera or projector, the projector in this instance, and additionally the curved screen surface whose curvature is concentric with that of the curvature of the path provided for imparting movement through arc to the projector;

Figure 2 is a side elevation of the same, showing the arcuate path or track, the projector, the actuating lever therefor, the link connection between the lever and crank, and the motor for the actuation of the crank;

Figure 3 is an enlarged fragmentary plan view illustrative of the arcuate slotted track, with its follower rigidly secured to the underside of the projector and adapted for shuttle-like movement in said arcuate slot and from end to end thereof, the view being indicated by the line 3—3, in Figure 2;

Figure 4 is an enlarged sectional detail taken through the guide track, follower, and actuating lever therefor, the view being indicated by the line 4—4, in Figure 3; and Figure 5 is a perspective view of the follower and the plate supporting the projector.

Referring to the drawings more particularly and in detail, the mechanism for accomplishing the arcuate movement of the projector comprises a support 6 having a table 7 mounted thereon embodying upstanding supporting arms 8 and 9, horizontally disposed arms 10 and 11, and an arcuately disposed guide track 12 having an arcuate guide slot 13 extending from end to end thereof, as clearly shown in Figure 1.

A follower 14 is mounted in the slot 13 and conforms in contour with that of the arcuate form of the slot into which it is fashioned for slidable movement, the follower having secured to its upper face a supporting plate 15 by means of screws, or other suitable device, 16.

The plate 15 supports the follower, being adapted to slide to and fro upon the upper finished face 17 of the guide track 12, the projector 18 being rigidly mounted upon this plate, by means of screws, or the like, 19, and adapted for movement therewith.

The interior moving parts of the projector, including the film, are driven by a suitable motor 20 carried thereby, but, since the projector per se forms no part of the invention, its description in detail will not be attempted. As thus mounted, the projector is caused to oscillate through arc from end to end of said slot by means of the follower 14, the follower, in turn, being actuated by the mechanism 21, to be hereinafter described in detail.

An actuating lever 22 is pivotally mounted, as indicated at 23, to the underside of the arm 11 and directly in the rear of the projector, the free end of the lever being slotted, as indicated at 24, to accommodate a stud 25 tapped into the central section of the follower 14, as clearly shown in Figure 4, the stud having thereon a roller 26 and provided at its outer end with a head 27 to hold the lever 22 in place.

The lever 22 is swung to extreme lateral positions in a horizontal plane, as indicated in Figure 1, by means of a link connection 28, the link, in turn, being connected to a crank 29 mounted directly upon the drive shaft of the motor 30, the motor, itself, being mounted upon the table 7 by means of a supporting bracket 31, Figure 2.

The throw of lever 22 may be varied to meet varying conditions by changing the position of the pivot point 32 thereof relative to the pivot point 23 of the lever 22 to reduce or enlarge the arcuate travel of the projector 18, thereby varying its scope of action relative to the screen 33.

The projecting screen 33, as here shown, is of the form of a section of the surface of a cylinder, with the arc-curvature of its surface concentric with the curvature of the guide slot 13, these respective curvatures being arcs of concentric circles, and so arranged that the convexity of the one faces the concavity of the other.

The projector is here shown as in central or normal position, Figure 1, with the optical axis 41 of its objective 40 extending to the center of the screen 33 and beyond to the center 42 of the inscribed and circumscribing circles of which the arc-curvature 34 of screen 33 and that of the guide slot 13 are arcs set off by common radii.

From the preceding it will be observed that the projector is at all times equidistant from the curved surface of the screen 33, and that at all points in its movements through arc the optical axis 41 of its objective 40 will pivot upon the aforesaid center and move radially thereabout in a plane cutting said center.

Since there is no variation in length of travel of the rays of light in their passage from the objective to the screen, and their consequent overlapping, due to the projector's movement in transit from extreme to extreme through its prescribed arc-course, there results projected pictures of perfect definition completely freed from all distortion.

Though a section of a cylindrical surface has been herein employed as affording a simple means for the illustration of the principle involved, it is obvious that a section of the surface of a sphere may be similarly made use of, with certain advantages of a decided character in its favor.

In providing for the creation of stereoscopic effects, the pictures would, of necessity, have to be first taken by a camera mounted and manipulated as herein provided for and their positives similarly projected, the rapidity of action in both instances being in synchronism, as to time, with the practice prevailing in the taking and the projection of motion pictures, the stereoscopic effect being dependent upon retinal retentivity, for the superaddition and fusing of the rapidly succeeding pictures taken from continuously changing view-points necessary thereto.

As previously stated, the camera or projector may be mounted for arcuate movement upon an arc of the inscribed circle, with the screen a section of the surface of a cylinder or a sphere, with the projection occurring upon the interior or concave surface thereof, without, in any-wise, departing from the spirit of the invention.

Having thus described my invention, I claim, and desire to secure by Letters Patent:

1. A device of the character described, including a screen and a remotely situated projector, said screen having an arcuate surface the convexity of which faces the projector, and means associated with the projector for imparting to it a movement in a horizontal plane, in an arcuate path concentric with the surface of the screen, and means for limiting the movement thereof.

2. In a device of the character described, in combination, a screen having a curved picture area, a projector remotely situated from said screen and adapted to project motion pictures thereon, means forming a support for said projector, a curved track carried by said support and having an arcuate guideway therein for the guidance of said projector in an oscillating movement relative to the screen, the curve of the picture area of the screen and the curve of the track being arcs of concentric circles.

3. In a device of the character described, comprising in combination, a motion picture apparatus, means forming a support therefor including an arcuately disposed guide slot, a follower in said guide slot, means for rigidly mounting said motion picture apparatus on said follower, a pin extending through said follower, a slotted actuating lever pivoted at one end of the support and having its slotted end engaging said pin and adapted to cause the arcuate movement of said follower in the guide slot, and power actuated means associated with said lever adapted to continuously move the same from side to side within the prescribed arc limits.

In testimony whereof I hereunto affix my signature.

GRAVES GRIFFITH.